US011952834B2

(12) United States Patent
Ford et al.

(10) Patent No.: US 11,952,834 B2
(45) Date of Patent: Apr. 9, 2024

(54) BRACKET

(71) Applicant: CAVITY SLIDERS LIMITED, Auckland (NZ)

(72) Inventors: Alexander Francis Ford, Auckland (NZ); Stacey Colleen Kenny, Auckland (NZ)

(73) Assignee: CAVITY SLIDERS LIMITED, Auckland (NZ)

( * ) Notice: Subject to any disclaimer, the term of this patent is extended or adjusted under 35 U.S.C. 154(b) by 0 days.

(21) Appl. No.: 17/631,683

(22) PCT Filed: Jul. 31, 2019

(86) PCT No.: PCT/IB2019/056525

§ 371 (c)(1),
(2) Date: Jan. 31, 2022

(87) PCT Pub. No.: WO2021/019284

PCT Pub. Date: Feb. 4, 2021

(65) Prior Publication Data

US 2022/0275679 A1 Sep. 1, 2022

(51) Int. Cl.

*E06B 3/96* (2006.01)
*E06B 1/12* (2006.01)
(Continued)

(52) U.S. Cl.

CPC .............. *E06B 3/9642* (2013.01); *E06B 1/12* (2013.01); *E06B 3/4654* (2013.01); *E06B 3/9644* (2013.01)

(58) Field of Classification Search

CPC ...... E06B 3/4654; E06B 3/964; E06B 3/9642; E06B 3/968; E06B 3/9687; E06B 3/976; E06B 2003/7074; E06B 2003/7082
(Continued)

(56) References Cited

U.S. PATENT DOCUMENTS 3,375,029 A 3/1968 Frye et al.
3,592,493 A 7/1971 Goose
(Continued)

FOREIGN PATENT DOCUMENTS

CN 104246243 12/2014
CN 208633723 U 3/2019
(Continued)

*Primary Examiner* — Ryan D Kwiecinski

(74) *Attorney, Agent, or Firm* — DANN, DORFMAN, HERRELL and SKILLMAN, P.C.

(57) ABSTRACT

A bracket for connecting a first extruded member having spaced and generally parallel extrusion fins to a second member. The bracket comprising a base plate, a longitudinal wedge element configured to be inserted in between the extrusion fins, an extrusion fin receiving channel to receive a first extrusion fin of the first extruded member, fastener receiving apertures through the base plate to receive a fastener to rigidly couple the bracket to the first extruded member, and a deformation cavity adjacent the fastener receiving aperture configured to receive a deformed extrusion portion of the first extrusion fin. The fastener receiving aperture is located on the base plate such that the deformed extrusion portion is forced into the deformation cavity and at least partially out of the extrusion fin receiving channel to form a rigid connection in a deformed condition when a fastener is located in the fastener receiving aperture.

22 Claims, 9 Drawing Sheets

(51) Int. Cl.
*E06B 3/46* (2006.01)
*E06B 3/964* (2006.01)

(58) Field of Classification Search
USPC .......................................................... 403/403
See application file for complete search history.

(56) References Cited

U.S. PATENT DOCUMENTS

| | | | | | |
|---|---|---|---|---|---|
| 4,278,361 | A * | 7/1981 | Steinke | F16B 7/0473<br>403/231 |
| 4,513,554 | A * | 4/1985 | Johnson | E06B 3/721<br>49/404 |
| 5,671,580 | A | 9/1997 | Chou | |
| 5,685,662 | A * | 11/1997 | Rollin | E06B 3/9642<br>403/231 |
| 6,331,092 | B1 * | 12/2001 | Linger | E04B 2/761<br>403/403 |
| 6,585,448 | B2 * | 7/2003 | Grossman | F16B 12/46<br>403/403 |
| 7,677,830 | B1 * | 3/2010 | Brown | A47C 4/02<br>403/231 |
| 8,453,387 | B2 | 6/2013 | Goepfert et al. | |
| D692,469 | S * | 10/2013 | Oetlinger | D15/138 |
| 9,016,972 | B2 | 4/2015 | Oetlinger | |
| 9,127,504 | B2 * | 9/2015 | Sprague | E06B 3/70 |
| 9,200,443 | B2 * | 12/2015 | Marple | F16B 7/00 |
| 9,593,702 | B2 | 3/2017 | Hooper, Jr. et al. | |
| 9,599,136 | B2 | 3/2017 | Rixen et al. | |
| 2005/0210770 | A1 | 9/2005 | Fackler | |

FOREIGN PATENT DOCUMENTS

| | | | | | |
|---|---|---|---|---|---|
| DE | 102014218466 | A1 * | 3/2016 | E06B 3/964 |
| EP | 694701 | A1 * | 1/1996 | B62D 33/044 |
| EP | 1245777 | B1 | 10/2005 | |
| EP | 1914375 | A1 * | 4/2008 | |
| EP | 3315709 | B1 | 5/2018 | |
| GB | 2132674 | A * | 7/1984 | E06B 3/4636 |
| GB | 2239885 | B | 7/1991 | |
| GB | 2461621 | A | 1/2010 | |
| JP | 2005163380 | A | 6/2005 | |
| WO | WO-9630658 | A1 * | 10/1996 | E04B 2/761 |
| WO | 2008090322 | A2 | 7/2008 | |

* cited by examiner

BRACKET

FIELD OF THE INVENTION

The present invention relates to an improved bracket, and method of assembling a fame. More particularly, but not exclusively, it relates to an improved bracket suitable for connecting extruded members together to form a frame in a pocket-door assembly.

BACKGROUND OF THE INVENTION

Some building structures are constructed from a framework of extruded metal members connected together to form a part of a desired structure. One example of such structure is a pocket-door where extruded members are connected together to construct a frame for the pocket-door.

These extruded members are commonly connected using a selection of different techniques. Some connections are provided by directly driving fasteners, nuts, bolts etc. through the extruded member. In other situations, plates, brackets, or other joiners or techniques (e.g. welding) may be used to connect and reinforce neighbouring members together.

The problem of loosening over time may arise with some traditional joining techniques used to connect extruded members. Connections for structures subject to movement such as a frame for a sliding door may be particularly prone to loosening. It would be desirable to provide rigid connections between extruded members in these situations.

Furthermore, driving fasteners directly through the extruded member may be difficult with traditional techniques. Some extruded members have been tailored to include specific features such as slots to receive brackets or screws. This may be time-consuming and expensive to create. It may be desirable to connect extruded members simply without having to cut specific slot features into the extruded members.

Connecting extruded members together can be a labour-intensive and time-consuming exercise, and therefore costly. Structures such as pocket-doors often involve connecting many members together, therefore the time, specialty tools-required and any problems associated with forming a rigid connection may be compounded.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

For the purpose of this specification, where method steps are described in sequence, the sequence does not necessarily mean that the steps are to be chronologically ordered in that sequence, unless there is no other logical manner of interpreting the sequence.

It is an object of the present invention to provide an improved bracket which overcomes or at least partially ameliorates some of the abovementioned disadvantages or which at least provides the public with a useful choice.

BRIEF DESCRIPTION OF THE INVENTION

According to a first aspect the invention broadly comprises a bracket for connecting a first extruded member having spaced and generally parallel extrusion fins to a second member, the bracket comprising:

a base plate, a longitudinal wedge element extending from the base plate in an extending direction configured to be inserted in between the extrusion fins, the longitudinal wedge element having a wedge length and wedge width, an extrusion fin receiving channel adjacent the wedge element to receive a first extrusion fin of the first extruded member, one or more fastener receiving apertures through the base plate to receive a fastener to rigidly couple the bracket to the first extruded member, and a deformation cavity adjacent the fastener receiving aperture configured to receive a deformed extrusion portion of the first extrusion fin, and wherein the fastener receiving aperture is located on the base plate such that the deformed extrusion portion is forced into the deformation cavity and at least partially out of the extrusion fin receiving channel to form a rigid connection in a deformed condition when a fastener is located in the fastener receiving aperture.

According to another aspect further comprising a constraining bracket flange extending from the base plate in the extending direction, the constraining bracket flange spaced from the wedge element.

According to another aspect the extrusion fin receiving channel is located between the wedge element and the constraining bracket flange.

According to another aspect at least a portion of the fastener receiving aperture intersects the extrusion fin receiving channel.

According to another aspect the constraining bracket flange comprises a recess to form a portion of the deformation cavity to receive the deformed extrusion portion of the first extrusion fin.

According to another aspect the fastener receiving aperture comprises a diameter greater than the wedge width configured to receive a fastener with the greater diameter.

According to another aspect the fastener receiving aperture is located off-centred between the first and second extrusion fins.

According to another aspect further comprising a second constraining element extending from the base plate, the second constraining element is spaced from the wedge element on a side opposite the constraining bracket flange to constrain a second extrusion fin of the first extruded member.

According to another aspect the second constraining element is a second constraining bracket flange.

According to another aspect the second constraining element is a constraining block.

According to another aspect the wedge width tapers from a proximal end to a distal end of the wedge element for insertion of the bracket.

According to another aspect the constraining bracket flange is substantially parallel to the longitudinal wedge element.

According to another aspect the wedge length is 25% to 95% the length of the constraining bracket flange.

According to another aspect the wedge length is 40% to 85% the length of the constraining bracket flange.

According to another aspect further comprising a second longitudinal wedge element in a different orientation to the first longitudinal wedge element, the second longitudinal wedge element configured to be inserted into the second member.

According to another aspect the bracket is a T-junction or corner bracket.

According to another aspect the invention broadly comprises a bracket assembly for connecting a first extruded member to a second member together, the assembly comprising:

a first extruded member having first and second extrusion fins, the first and second extrusion fins spaced and generally parallel each other, a second member connected to the first extruded member, a bracket connecting the second member to the first extruded member, and one or more fasteners inserted through the fastener receiving apertures, and wherein the fastener abuts the first extrusion fin such that the deformed extrusion portion is locally deformed at least partially out of the extrusion fin receiving channel and into the deformation cavity to form a rigid connection.

According to another aspect the deformed portion is plastically deformed in the deformation cavity to form a rigid connection.

According to another aspect the deformed portion of the first extruded member is deformed around the fastener.

According to another aspect the deformed portion is deformed between the fastener and the constraining bracket flange.

According to another aspect the first extrusion fin is constrained between the constraining bracket flange and the longitudinal wedge element in the extrusion fin receiving channel.

According to another aspect one or both of the first and second extrusion fins elastically deform in a tight-fit between the bracket and the first extruded member, when the wedge element is inserted.

According to another aspect the second member is connected at an angle to the first extruded member.

According to another aspect the second member is substantially perpendicularly connected the first extruded member.

According to another aspect the second member is a second extruded member comprising generally parallel extrusion fins.

According to another aspect the bracket assembly forms part of a pocket-door assembly.

According to another aspect the invention broadly comprises a method for connecting an extruded member comprising:

providing a first extruded member having first and second extrusion fins, the first and second extrusion fins spaced and generally parallel each other, providing a second member, inserting the bracket as claimed in any one of claims 1 to 16 into the first extruded member and the second member to connect the members together, driving one or more fasteners into the fastener receiving apertures of the bracket causing localised deformation of a portion of the first extrusion fin to form a rigid connection.

According to another aspect the deformed portion of the first extruded member is deformed around the fastener as the fastener is driven through the fastener receiving aperture.

According to another aspect the one or more fasteners form an interference fit as the fastener is driven through the fastener receiving aperture.

According to another aspect the bracket is inserted onto an outward facing side of the extruded members.

According to another aspect further comprising inserting the wedge element between the extrusion fins of the first extruded member before driving the one or more fasteners.

According to another aspect further comprising inserting an extending portion of the bracket into a cavity of the second member before driving the one or more fasteners.

According to another aspect the second member is connected at an angle to the first extruded member.

According to another aspect the invention broadly comprises a kitset for a modular pocket-door comprising:

a door panel, a first extruded member having first and second extrusion fins, the first and second extrusion fins spaced and generally parallel each other, a second extruded member configured to be connected to the first extruded member to form part of a frame for the pocket-door, a bracket as claimed in any one of claims 1 to 16 to connect the second member to the first extruded member, one or more fasteners configured to fit through the fastener receiving apertures.

According to another aspect further comprising an adjustable door guide having a vertical guide member which rotates relative to a base support to accommodate different groove widths in the door panel.

According to another aspect the adjustable door guide comprises a rotating lever engaging an underside of the base support.

According to another aspect further comprising a jamb connector to join the door to the frame, the jamb connector having a wave profile.

According to another aspect the invention broadly comprises an adjustable door guide comprising a vertical guide member which rotates relative to a base support to accommodate different groove widths in the door panel as herein described and with reference to any one or more of FIGS. 16 to 18.

According to another aspect the invention broadly comprises a jamb connector to join a door to a frame, the jamb connector having a wave profile as herein described and with reference to any one or more of FIGS. 13 to 15B.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification and claims means "consisting at least in part of". When interpreting statements in this specification and claims which include that term, the features, prefaced by that term in each statement, all need to be present but other features can also be present. Related terms such as "comprise" and "comprised" are to be interpreted in the same manner.

BRIEF DESCRIPTION OF THE DRAWINGS

The invention will now be described by way of example only and with reference to the drawings in which.

DETAILED DESCRIPTION OF PREFERRED EMBODIMENTS

According to various aspects of the various embodiments of the present invention as illustrated in FIGS. 1-19, there is provided an improved bracket, bracket assembly and method for connecting an extruded member using the improved bracket which will now be described. It will be appreciated that these figures illustrate the general principles of the structure and construction, and that the invention is not limited to the precise configurations illustrated.

Figure 1:
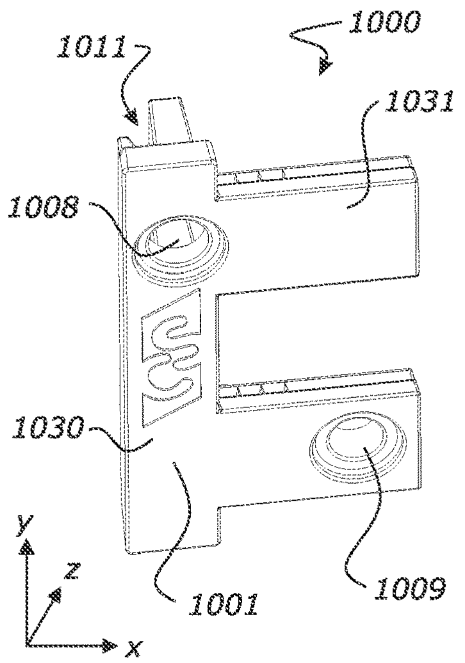
FIG. 1 shows a front-perspective view of a first embodiment bracket.

As illustrated in FIG. 1, there is provided a bracket 1000 for connecting a first extruded member 100 to a second member 200.

It is anticipated in some independent configurations, features of the bracket 1000 provide improvements over existing brackets.

In other independent configurations, the assembly, kit including the bracket 1000 as well as the first and second members 100, 200 provide improvements over existing connections.

The bracket 1000 is adapted to connect a first extruded member 100 which has spaced and generally parallel extrusion fins 101, 102 (referenced in FIGS. 3 and 5A) to a second member 200. The extrusion fins 101, 102 are features which extend from the first extruded member 100 which the bracket 1000 can interact with to form a rigid connection (described in more detail below).

Preferably, the extrusion fins 101, 102 extend along an extrusion direction (Y).

Figure 19:
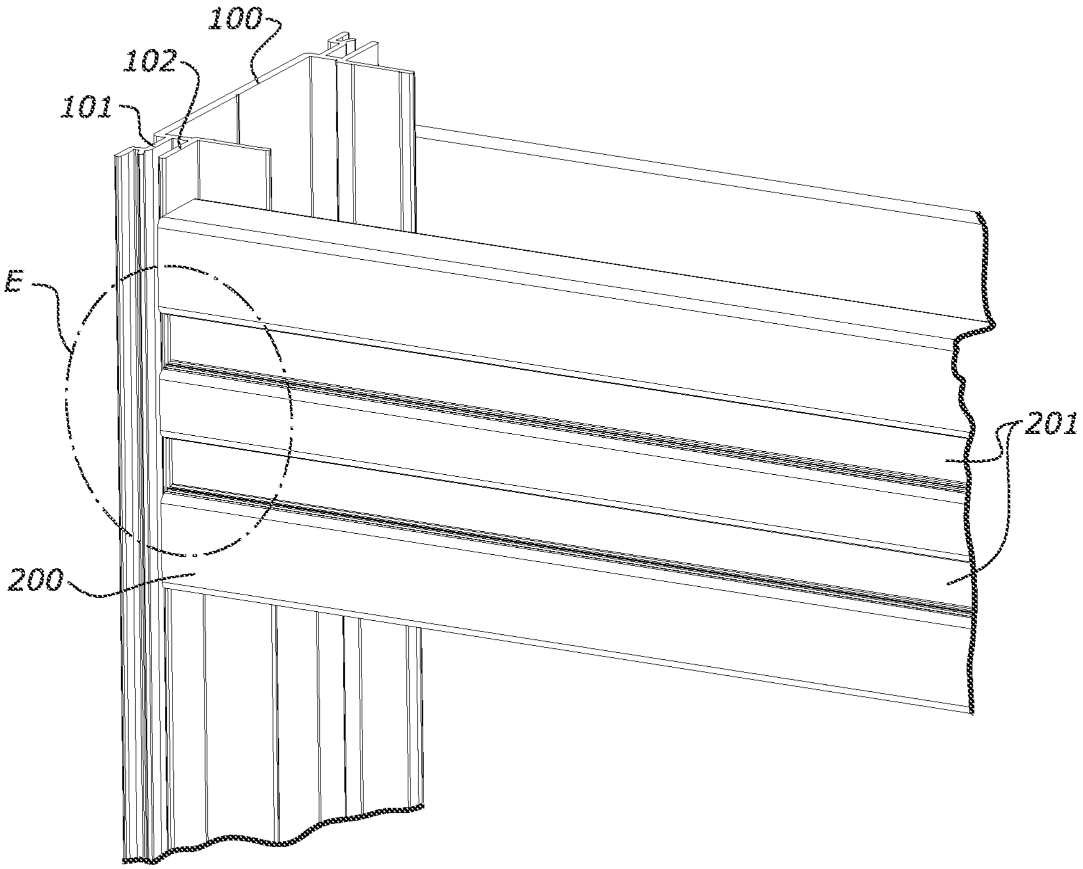
FIG. 19 shows a perspective view of extruded members for a building structure.

In the preferred configurations, the second member 200 is a second extruded member. In these preferred configurations, the bracket 1000 joins two extruded members 100, 200 together. FIG. 19 shows an example of extruded members 100, 200 which may be joined together using the bracket 1000. The dotted oval (E) marks where the bracket 1000 can be inserted to join the members 100, 200 together.

In some configurations, the second extruded member like the first extruded member comprises generally parallel extrusion fins.

The second member 200 may be connected at an angle to the first extruded member 100.

In some configurations, the second member 200 is substantially perpendicularly connected the first extruded member 100.

It is anticipated that the first and second members 100, 200 can be connected at other desired angles. The placement of features such as a wedge element 1002 and constraining bracket flange 1010 should be located accordingly to provide the desired angle (these features will be introduced later).

In other configurations, the bracket 1000 connects first and second members 100, 200 which are in a parallel relationship. Location of features such as a wedge element 1002 and constraining bracket flange 1010 should be located accordingly.

Figure 13:
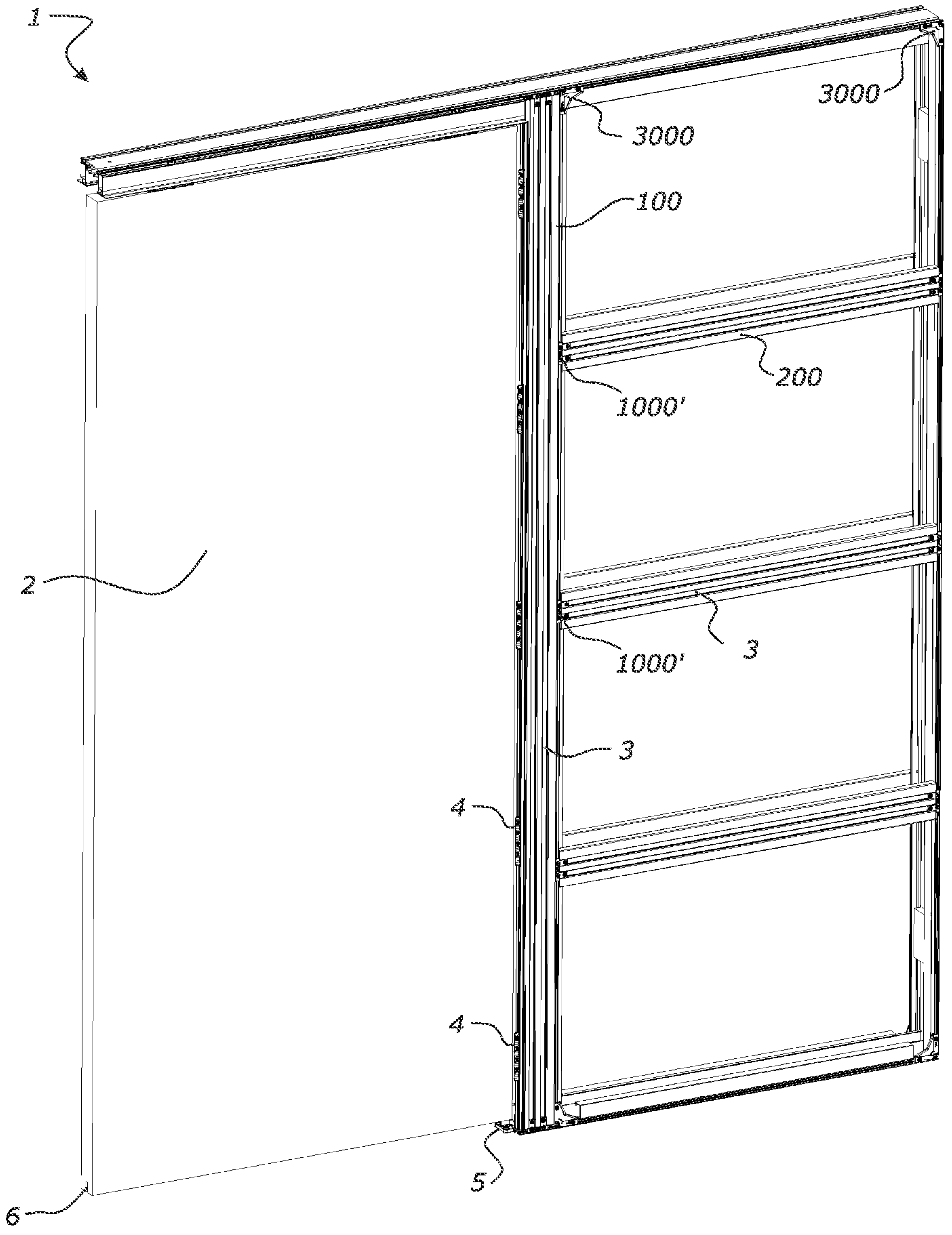
FIG. 13 shows a perspective view of a pocket door assembly.

Multiple brackets 1000 may be used to connect multiple extruded members together to form building structures such as frames. It is anticipated that the bracket 1000 of the present invention may be particularly useful for applications such as connecting extruded members 100, 200 in a pocket door assembly as illustrated in FIG. 13.

It should be appreciated that the bracket 1000 may be used in other applications where extruded members need to be connected together to form other structures such as frames for windows, doors, other framing, or shelving, for example.

It should also be appreciated that the first extruded member 100 may be connected to a second member 200 which is not an extruded member. For example, the bracket 1000 may be used to connect the first extruded member 100 to a solid post member which is not extruded.

As illustrated in FIG. 1, in all the preferred configurations, the bracket 1000 comprises a base plate 1001.

Preferably, a longitudinal wedge element 1002 extends from the base plate 1001. The wedge element 1002 extends in an extending direction (Z) as referenced in FIGS. 1, 3 and 4. The wedge element 1002 has a wedge length 1003 and a wedge width 1004.

In the preferred configurations, the wedge element 1002 is configured to be inserted in between the extrusion fins 101, 102. The wedge element 1002 can help locate and guide the bracket 1000 into the first extruded member 100.

Figure 5A:
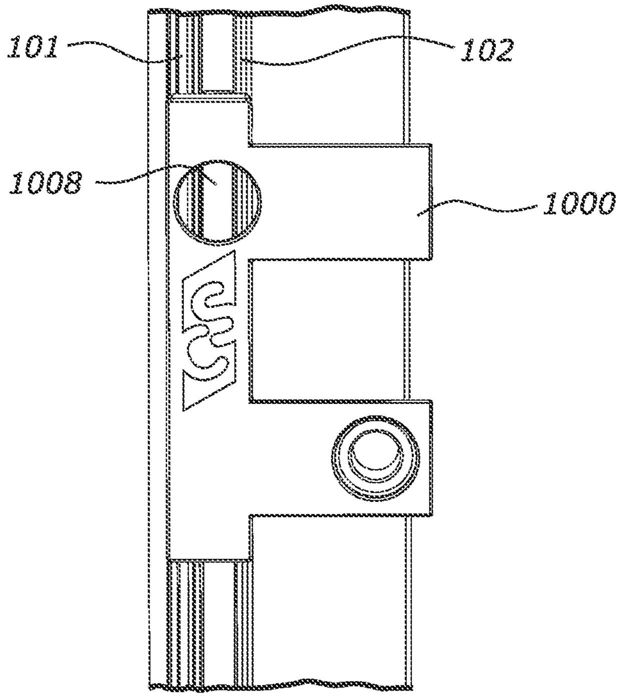
FIG. 5A shows a schematic of the bracket and an undeformed extruded member.
Figure 5B:
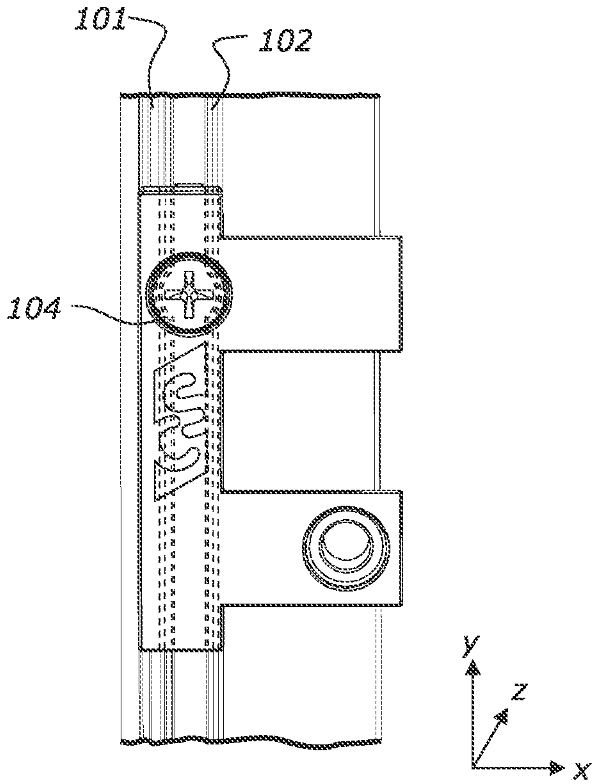
FIG. 5B shows a schematic of the bracket and a deformed extruded member.
Figure 5C:
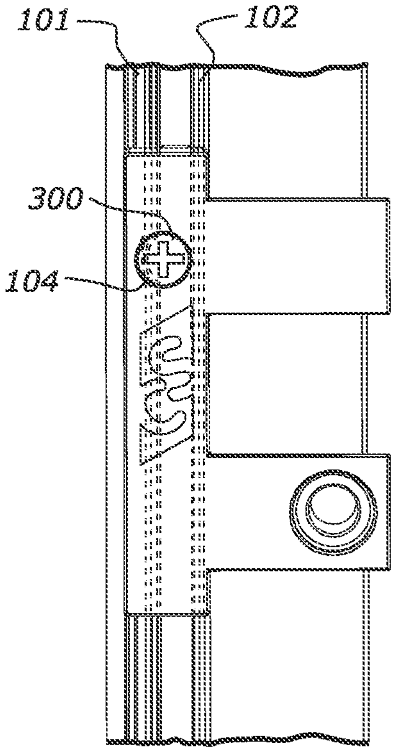
FIG. 5C shows a schematic of the bracket and a deformed extruded member with a different fastener location to FIG. 5B.
Figure 5D:
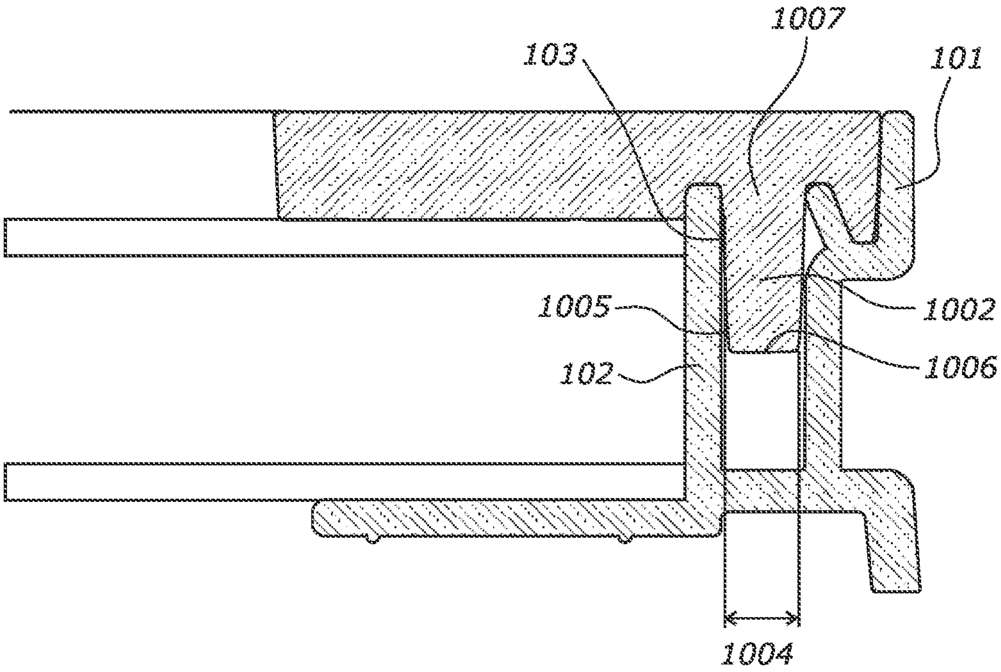
FIG. 5D shows a cross-sectional view of FIG. 3 along the line A.

Preferably, a wedge outer wall 1005 abuts an extrusion fin inner wall 103 as shown in FIG. 5D.

In the preferred configurations, the bracket 1000 and the extruded member 100 engage to provide a large/long contacting surface area. The long contacting surface area is provided along the extrusion fin 101 and the wedge element 1002. The large/long contacting surface area can help form a tight-fit.

It should be appreciated that in these configurations, the present invention can provide the advantage of a tight-fit between the bracket 1000 and the extruded member having a simple extrusion (e.g. having extrusion fins 101, 102).

In some configurations, the wedge width 1004 at a distal end 1006 of the wedge element 1002 is narrower than a proximal end 1007 of the wedge element. The wedge width 1004 tapers from the proximal end 1007 to the distal end 1006 of the wedge element 1002. The narrower distal end 1006 can help with insertion of the bracket between the extrusion fins 101, 102. The wider proximal end 1007 can help provide a tight connection between the bracket 1002 and the first extruded member 100.

In other configurations, the wedge width 1004 is substantially the same throughout the wedge element 1002, i.e. the proximal and distal ends 1007, 1006 are of the same width (not shown).

Figure 4:
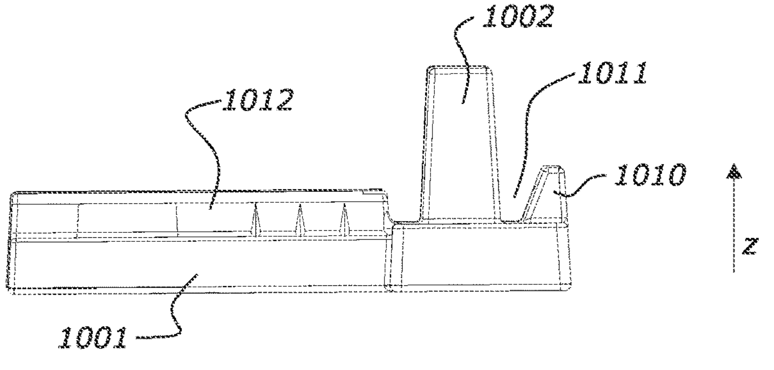
FIG. 4 shows a side view of the bracket in FIG. 1.

In the preferred configurations, the bracket 1000 further comprises a constraining bracket flange 1010 extending from the base plate 1001 in the extending direction (Z), as shown in FIG. 4. The constraining bracket flange 1010 constrains the movement of the first extrusion fin 101 (when assembled). Preferably, the constraining bracket flange 1010 prevents deformation of the first extrusion fin 101 except for at a localised region around a fastener 300 (described later).

Preferably, the constraining bracket flange 1010 is spaced from the wedge element 1002.

Preferably, the constraining bracket flange 1010 is substantially parallel to the longitudinal wedge element 1002.

In some preferred configurations, the constraining bracket flange's 1010 width tapers from a proximal end to a distal end. This feature helps with insertion and provides a tight-fit like the wedge element 1002 as described above. Like above, in other configurations, the width of the constraining bracket flange's 1010 may also be substantially the same through the flange.

Figure 2:
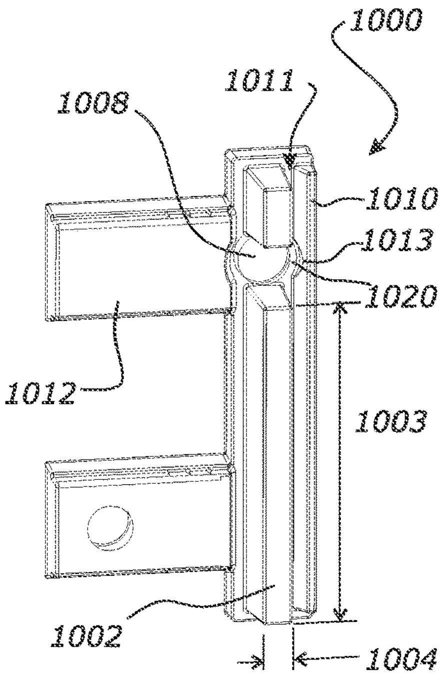
FIG. 2 shows a back-perspective view of the bracket in FIG. 1.

Preferably, the bracket 1000 comprises a second constraining element 1012 extending from the base plate 1001 (referenced in FIGS. 2 and 4). Preferably, the second constraining element is spaced from the wedge element 1002 on a side opposite the constraining bracket flange 1010 to constrain the second extrusion fin 102 of the first extruded member.

In some configurations as shown in FIG. 2, the second constraining element 1012 is a constraining block.

Figure 9:
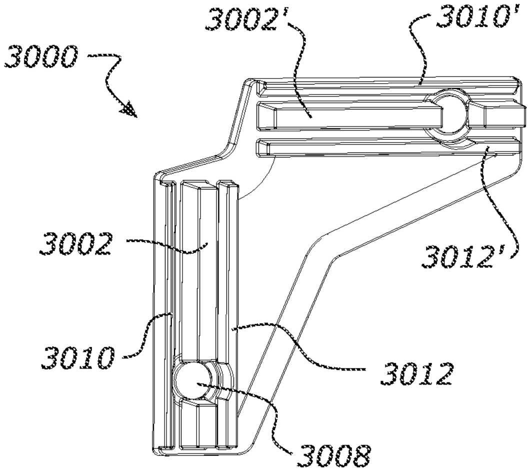
FIG. 9 shows a back-perspective view of the bracket in FIG. 8.

In other configurations, such as shown in FIG. 9, the second constraining element is a constraining flange 3012.

Preferably, the wedge element 1002 is of a wedge length 1003 which provides a sufficient length engagement between the wedge element and the first extrusion fin 101. The engaging length is relatively long and can effectively limit movement of the bracket 1000 in relation to the extruded member 100.

Preferably, the wedge length (104) is 25% to 95% the length (1003) of the constraining bracket flange.

In the preferred configurations, the wedge length (104) is 40% to 85% the length (1003) of the constraining bracket flange.

In the preferred configurations, one or both of the first and second extrusion fins 101, 102 deform a tight-fit between the bracket 1000 and the first extruded member 100, when the wedge element 1002 is inserted. In some cases, the fins elastically deform a small amount to get a tight-fit.

Preferably, the extrusion fins 101, 102 undergo pretensioning due to the tight-fit between the wedge element 1002 and the constraining bracket flange 1010.

The bracket 1000 may be adapted to connect extruded members 100, 200 formed from a range of different materials. Preferably, the extruded member is formed from a material which provides the structural or strength properties required, while also being deformable or include deformable sections.

It is anticipated, that the bracket 1000 can be suitable for aluminium extruded members which are commonly used for framing in building structures. The bracket 1000 may be suitable for extruded members formed from other materials (e.g. other metals or plastic).

Preferably, an extrusion fin receiving channel 1011 is adjacent the wedge element 1002 as referenced in FIG. 2. The extrusion fin receiving channel 1011 is configured to receive a first extrusion fin 101 of the first extruded member 100.

In some preferred configurations, the extrusion fin receiving channel 1011 is formed between the wedge element 1002 and the constraining bracket flange 1010.

To rigidly couple the bracket 1000 to the first extruded member 100, fasteners 300 are provided.

In some preferred configurations, the fasteners 300 used with the bracket 1000 are screws (for example self-tapping screws). Preferably, the fastener comprises a head and a shaft configured to fit through a fastener receiving aperture 1008 in the bracket 1000. It is anticipated that other fasteners known to a person skilled in the art may be suitable to form a rigid connection between the bracket 1000 and the first extruded member 100.

Preferably, the bracket 1000 comprises one or more fastener receiving apertures 1008 through the base plate 1001 to receive the fastener 300.

In a bracket assembly, the one or more fasteners 300 are inserted through the fastener receiving apertures 1008.

As the fastener 300 is inserted through the bracket 1000 and into the first extruded member 100, a portion 104 of the first extrusion fin 101 deforms as is necessary for the fastener to seat properly. Deformation of the first extrusion fin 101 is illustrated in FIGS. 5A to 5E. The first extrusion fin 101 deforms as the fastener 300 forces the fin outwardly in a deformation direction (X).

FIG. 5A shows a schematic of the bracket 1000 and the first and second extrusion fins 101, 102 in an undeformed condition, where a fastener 300 has not been inserted.

Preferably, this undeformed condition, the fastener receiving aperture 1008 overlaps one or both of the first and second extrusion fins 101, 102. This occurs as in these preferred configurations, at least a portion of the fastener receiving aperture 1008 intersects the extrusion fin receiving channel 1011.

FIGS. 5B and 5C shows schematics of configurations where the bracket 1000 and the first and second extrusion fins 101, 102 are in a deformed condition, where a fastener 300 has been inserted.

Preferably, the one or more fasteners 300 form an interference fit as the fastener is driven through the fastener receiving aperture.

The fastener 300 abuts the first extrusion fin 101 such that the deformed extrusion portion 104 is locally deformed at least partially out of the extrusion fin receiving channel 1011 and into a deformation cavity 1020 (described later) to form a tight and substantially rigid connection, due to the interference fit.

A portion 104 of the first extrusion fin 101 deforms as the fastener 300 is inserted due to the location and/or size of the fastener receiving aperture 1008.

As shown in FIGS. 5A and 5B, in some configurations, the fastener receiving aperture 1008 is sized to intersect the extrusion fin receiving channel 1011. In some configurations, the fastener receiving aperture 1008 comprises a diameter greater than the wedge width 104. In this configuration, the fastener receiving aperture 1008 is configured to receive a fastener 300 with the greater diameter.

As shown in FIG. 5C, in some configurations, the fastener receiving aperture 1008 is located off-centred between the first and second extrusion fins 101, 102. The off-centre location of the aperture 1008 results in an aperture which is at least partially in the extrusion fin receiving channel 1011

The deformation of the first extrusion fin 101 is preferably constrained by the constraining bracket flange 1010. Preferably, the first extrusion fin 101 is constrained between the constraining bracket flange 1010 and the longitudinal wedge element 1002 in the extrusion fin receiving channel 1011.

In other configurations, the extrusion fin 101 deforms around the fastener 300 as the fastener is driven into the bracket 1000, however the extrusion fin 101 is not constrained by a constraining bracket flange and is held in place due to the contact between the extrusion fin and the fastener.

Figure 5E:
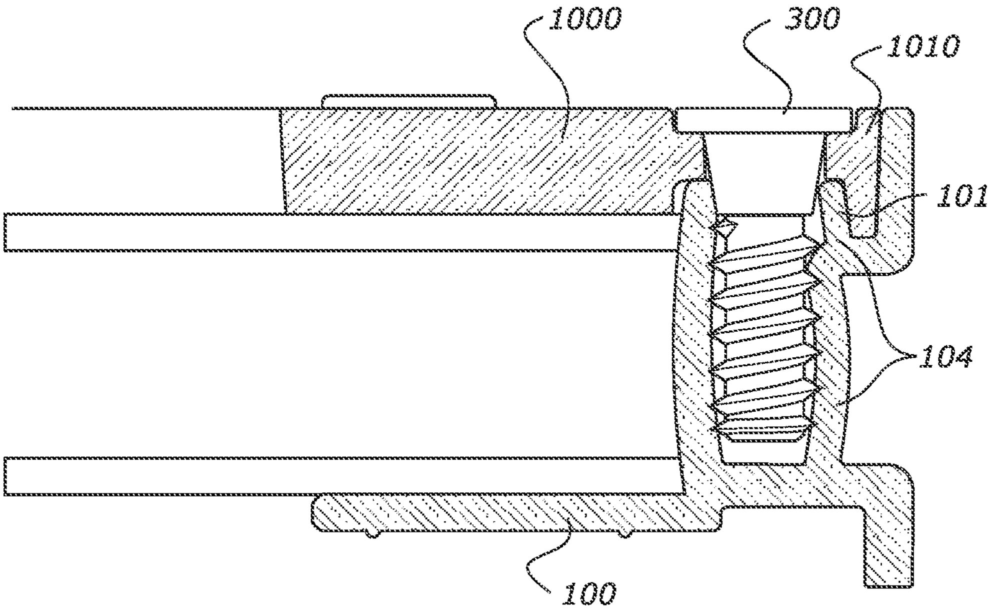
FIG. 5E shows a cross-sectional view of FIG. 3 along the line B.

Preferably, the deformed portion 104 is deformed between the fastener 300 and the constraining bracket flange 1010 as shown in FIG. 5E (when a fastener 300 has been inserted).

Preferably, the deformed portion 104 of the first extruded member 100 is deformed around the fastener 300.

To form a rigid connection, preferably the deformed portion 104 is plastically deformed in the deformation cavity 1020.

In the preferred configurations, the connection is a permanent connection between the first and second members 100, 200 due to the plastic deformation.

Controlled localised deformation of the extruded member 100 provides a rigid connection between the bracket 1000 and the extruded member. A rigid connection is desirable to maintain the structural integrity of building structures. A rigid connection may be particularly important in structures which are subject to repetitive movement, such as at doorways, windows (e.g. a frame for a sliding door).

A non-rigid connection (e.g. one which loosens over time) is undesirable as it may impact how the structure performs. For example, with sliding pocket doors, a non-rigid connection may cause misalignment of components which may affect the smoothness or operation of the sliding door. A non-rigid connection may cause undesirable creaking. In some circumstances, a structure which is not well-connected may also be unsafe and prone to structural failure.

Preferably, in the present invention the deformation direction (X) is orthogonal to an extruding direction (Y) of the first extruded member as referenced in FIG. 5B. The extruding direction (Y) is the direction which the first extruded member is extruded. Typically, the cross section of an extruded member is constant throughout its length in the extruding direction.

Most preferably, the deformation direction (X) is orthogonal to both the extruding direction (Y) of the first extruded member and the extending direction (Z) of the wedge element 1002 of the bracket 1000.

In the preferred configurations, the bracket 1000 further comprises a deformation cavity 1020, shown in FIG. 2. The deformation cavity 1020 is preferably adjacent the fastener receiving aperture 1008. The deformation cavity 1020 is configured to receive the deformed extrusion portion 104 of the first extrusion fin 101.

Preferably, the deformation cavity 1020 provides a space for the deformed extrusion portion 104 to move into, once that portion has been deformed by the insertion of the fastener 300.

In some configurations, the constraining bracket flange 1010 comprises a recess 1013 (referenced in FIG. 2) to form a portion of the deformation cavity 1020 to receive the deformed extrusion portion 104 of the first extrusion fin.

It is anticipated, that the deformation cavity 1020 may be formed by another feature in the bracket (other than the presence of a recess 1013 in the constraining bracket flange 1010). For example, the deformation cavity 1020 may be formed as a slot in the constraining bracket flange 1010.

In the preferred configurations, the fastener receiving aperture 1008 is located on the base plate 1001 such that the deformed extrusion portion 104 is forced into the deformation cavity 1020 in a deformed condition. The deformed condition is provided when the fastener 300 is located in the fastener receiving aperture 1008.

Preferably, the deformed extrusion portion 104 is also located at least partially out of the extrusion fin receiving channel 1011 in the deformed condition as shown in FIG. 5B to form a rigid connection.

In the preferred configurations, both the first and second extrusion fins 101 deform, 102 once the fastener 300 has been driven into the bracket as shown in FIG. 5B to provide a rigid connection.

In other configurations, one of the first and second extrusion fins 101, 102 deform once the fastener 300 has been driven in to provide the rigid connection, as shown in FIG. 5C. In the FIG. 5C schematic, the first extrusion fin 101 deforms and has a deformed extrusion portion 104 between the fastener 300 and constraining bracket flange 1010.

Preferably, the bracket 1000 is rigidly connected to the first extruded member 100 after the fastener 300 is inserted.

Preferably, the bracket 1000 is rigidly connected to the second member.

Preferably, the first extruded member is rigidly connected to the second member by the bracket 1000.

In some configurations, the bracket 1000, 2000 is a T-junction bracket. These brackets connect first extruded and second members 100, 200 together at a T-junction as illustrated in FIG. 13.

In some configurations, the T-junction connector 1000, 2000 (FIGS. 1 and 6A) comprises a body 1030, 2030 and one or more arms 1031, 2031 dependent from the body. Preferably, the body 1030, 2030 interacts with one of the first and second extruded members 101, 102, and the arm(s) 1031, 2031 are adapted to interact with the other extruded member.

In other configurations as shown in FIGS. 8 to 12, the bracket 3000 is a corner bracket. These brackets connect first extruded and second members together 100, 200 at the corners of a building structure (FIG. 13).

In the preferred configurations, the bracket 1000 is adapted to attach on an outward facing side 3 of the extruded members 100, 200. It should be appreciated that in these configurations, the bracket can provide the advance of assembly on a flat body surface. Furthermore, the described bracket can improve the ease of access to the bracket and improve speed and ease of assembly.

Figure 3:
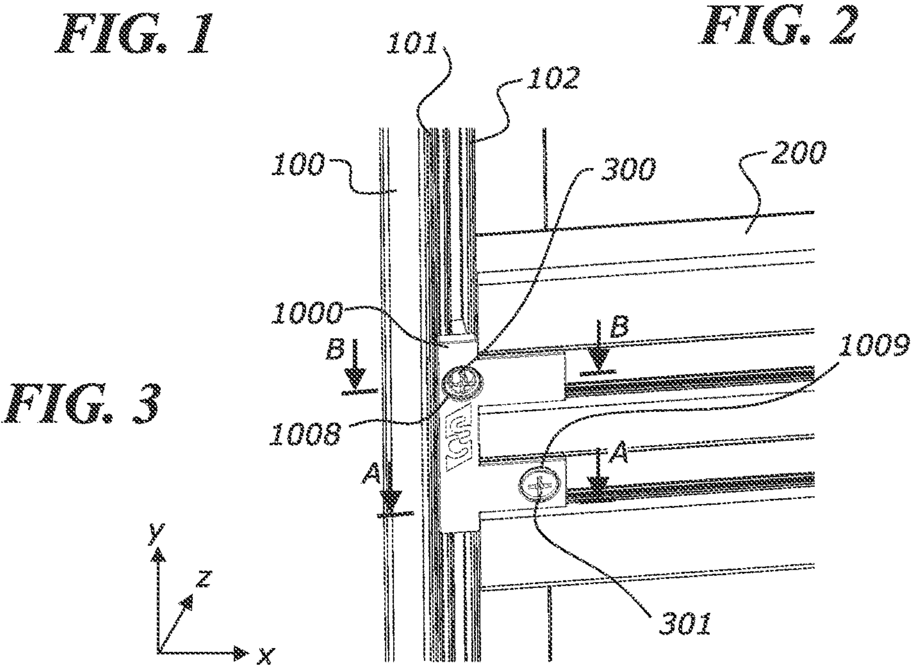
FIG. 3 shows a connection provided by the bracket in FIG. 1.

Optionally, the bracket 1000 comprises auxiliary fastener receiving apertures 1009 as referenced in FIGS. 1 and 3. These apertures are configured to receive fasteners 301 which help form a connection between the bracket and an extruded member. In some configurations, these fasteners 301 are not configured to deform an extrusion fin to provide a rigid connection, instead the fasteners may provide a connection by pressing against the extruded member, or may be a traditional fixing.

In some configurations the bracket 1000 is a die-cast bracket. It is anticipated other methods known by a person skilled in art may be used to form the bracket.

In the preferred configurations, the bracket 1000 is formed by a durable material such as a suitable metal such as zinc, aluminium and/or tin alloys. It is anticipated other suitable materials known by a person skilled in art may be used to form the bracket.

Figure 6A:
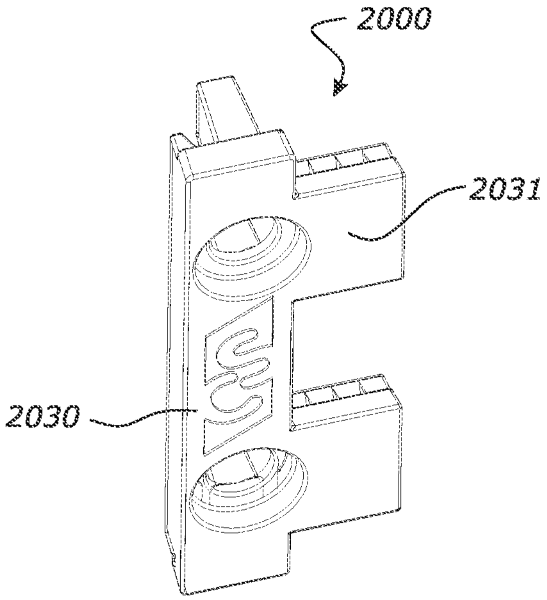
FIG. 6A shows a front-perspective view of a second embodiment bracket.
Figure 6B:
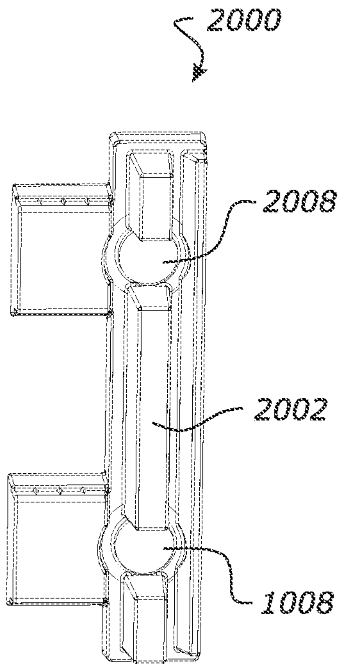
FIG. 6B shows a back-perspective view of the bracket in FIG. 6A.
Figure 6C:
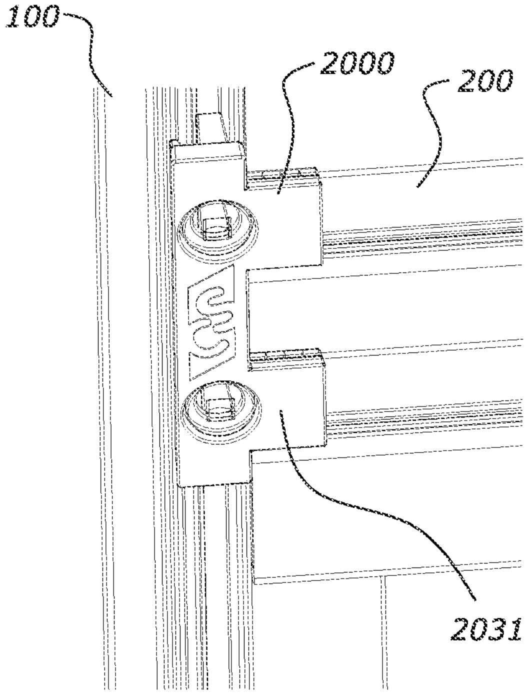
FIG. 6C shows a connection provided by the bracket in FIG. 6A.

Another embodiment of the present invention is depicted in FIGS. 6A to 6C. In this embodiment, the bracket 2000 has features which are the same or similar to the ones described above in the first embodiment and follows the construction above. Comparable features are numbered similarly to the first embodiment.

A primary difference in this embodiment is that the bracket 2000 comprises two fastener receiving apertures 2008 to receive fasteners 300. This embodiment illustrates that in some configurations of the present invention, more than one fastener 300 may be driven into the bracket assembly to provide an improved substantially rigid connection. This may be especially useful where the bracket is connected to a relatively long extruded member, which needs to be rigidly deformed at multiple locations along the bracket to provide the desired rigid connection.

Figure 7:
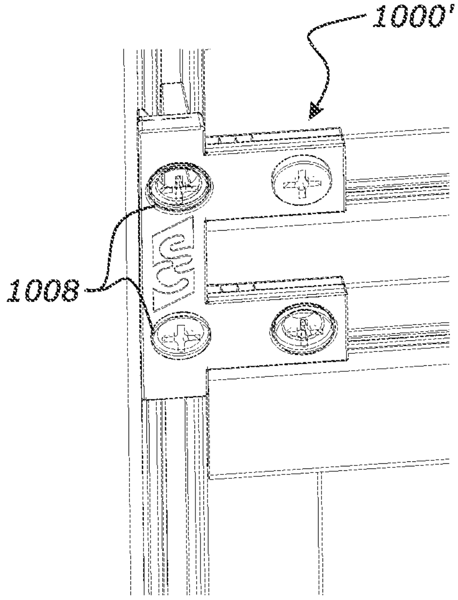
FIG. 7 shows a connection provided by the bracket in FIG. 1 with additional fasteners.
Figure 8:
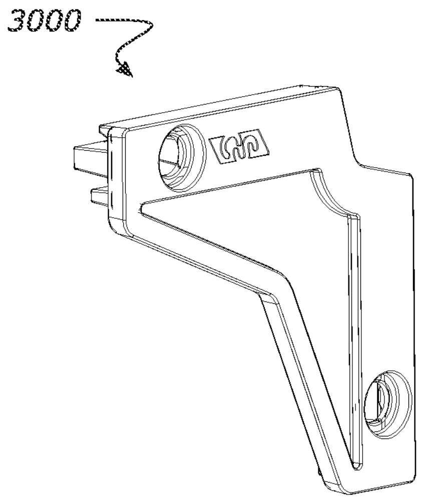
FIG. 8 shows a front-perspective view of a third embodiment bracket.

FIG. 7 shows a variation of the first embodiment, where the bracket 1000' also comprises two fastener receiving apertures 1008 to receive fasteners 300.

Another difference is the arms 2031 of the bracket 2000 as shown in FIG. 6A. The arms 2031 of the bracket 2000 do not include an auxiliary fastener receiving aperture 1009 as shown in FIG. 1. Instead the arm 2031 itself is a shorter component which provides sufficient connection between the bracket 2000 and the second member 200.

Another embodiment of the present invention is depicted in FIGS. 8 to 12. In this embodiment, the bracket 3000 has features which are the same or similar to the ones described and follows the construction above.

Figure 10:
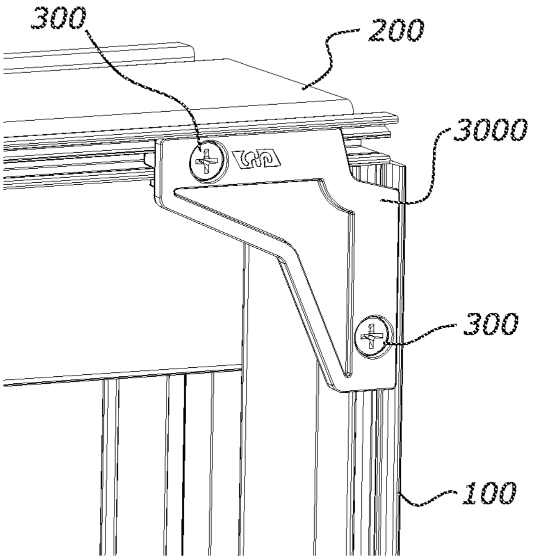
FIG. 10 shows a connection provided by the bracket in FIG. 8.
Figure 11:
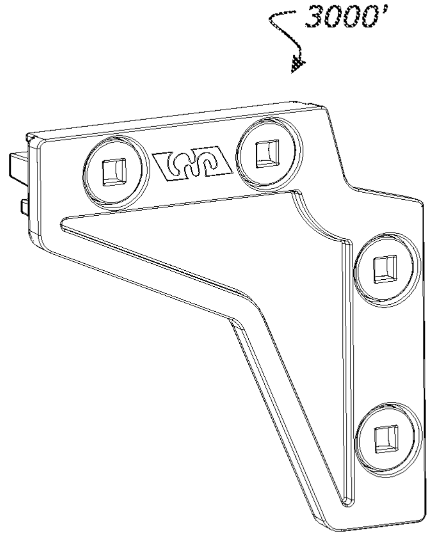
FIG. 11 shows a perspective view of the bracket in FIG. 8 with additional fasteners.
Figure 12:
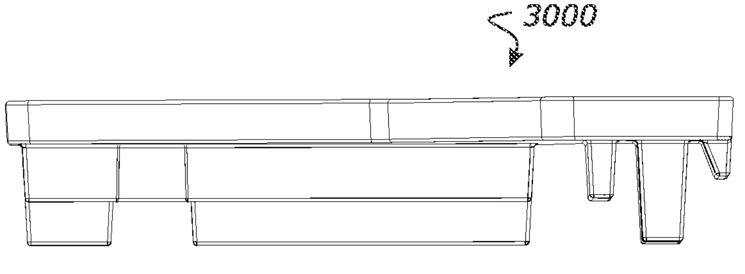
FIG. 12 shows a side view of the bracket in FIG. 8.

The bracket 3000 in this embodiment is a corner bracket to connect first and second members 100, 200 at a corner of a structure as shown in FIG. 10.

As shown in FIG. 9, in some configurations, the bracket 3000 comprises two constraining flanges 3010, 3012. Preferably, these constraining elements constrain two extrusion fins 101, 102 of the extruded member to prevent deformation (except at localised regions, such as provided by a defamation cavity), as described above.

Preferably, the bracket 3000 comprises a second longitudinal wedge element 3002' in a different orientation to the first longitudinal wedge element 3000. The second longitudinal wedge element 3002' is configured to be inserted into the second member 200.

It is anticipated that in some configurations, the described interaction between a first extruded member 100 due to a first set of features on the bracket, may be applicable to the second extruded member 200 also.

In some configurations for example, a second set of features on the bracket 300 (e.g. the wedge element 3002', constraining bracket flange 3010' and fasteners 300) interact with the second extruded member 200 in the same or similar way as the set of features which interact with the first extruded member 100, as shown in FIG. 9.

As fastener(s) 300 are driven at the second extruded member 200 through the bracket 3000, localised deformation of the second extruded member occurs, like the first extruded member 100 described above. The resulting connections provide a rigid joint between the first and second extruded members 100, 200.

It should be appreciated that having two sets of bracket features to connect the bracket to the first and second extruded members 100, 200 in the same way is not limited to corner brackets, and may be applied to other brackets, such as a T-joiner bracket.

It should be appreciated that a feature in one embodiment will have the same function in another embodiment where the construction is comparable.

Figure 14:
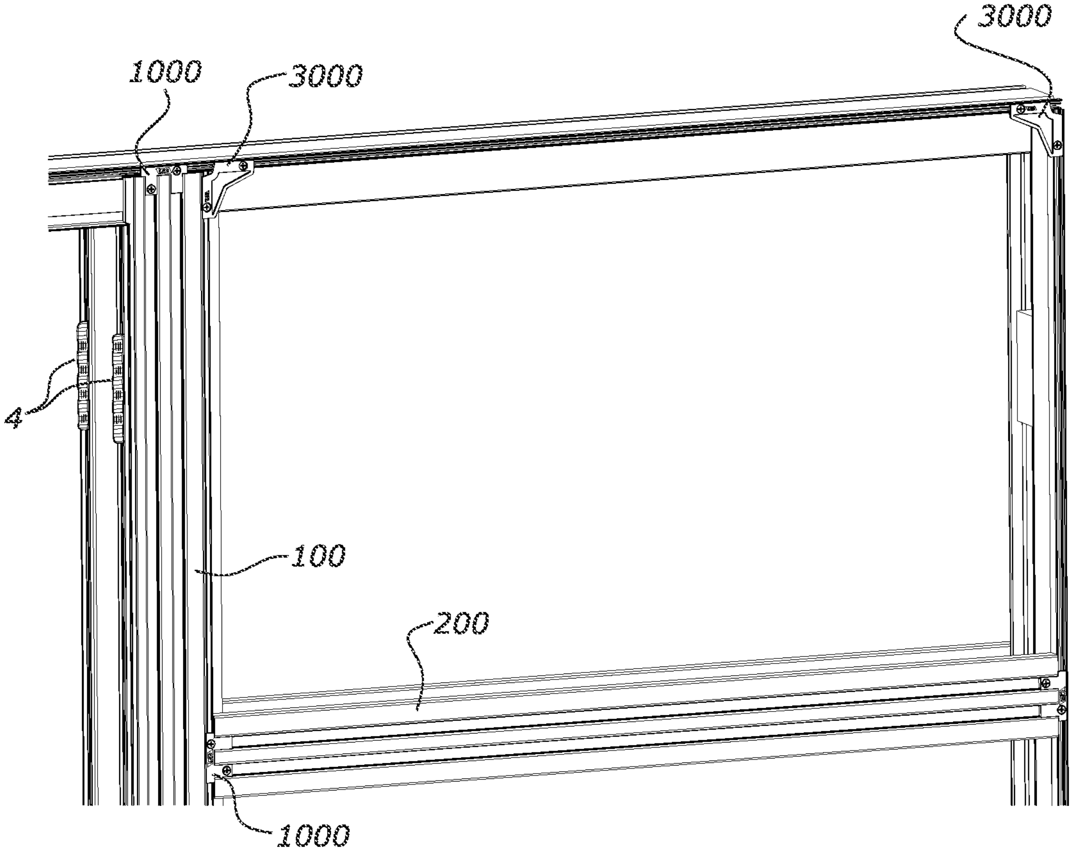
FIG. 14 shows a close-up view of connections in FIG. 13.

It is anticipated, the bracket will be constructed to include features suitable for to the application. For example, as shown in FIGS. 13 and 14, different variations of the bracket of the present invention may be used in a single building structure. In this example, a combination of T-junction brackets 1000, 1000' and corner-junction brackets 3000 are used in the pocket-door frame 1.

Following the description of the structure of the present invention described above, a general description of the method of connecting an extruded member using the bracket of the present invention will now be described.

The assembly of the present invention is configured to be assembled together simply and quickly. A simple assembly reduces the time required to connect members 100, 200 together and therefore reduce associated labour costs.

Furthermore, a quick and simple connection may be beneficial as the skill level required to connect members 100, 200 together to form a building structure will be lower than other more complex processes. An intuitive connection process may allow these building structures to be installed by less specialised workers, or in some cases a consumer may be able to install the structure themselves.

In the preferred configurations, the first extruded member 100 and the second member 200 is provided as shown in FIG. 19.

The first extruded member 100 and the second member 200 are connected together using a bracket 1000, 2000, 3000 as described. Preferably, the bracket 1000 is inserted into the first extruded member 100 and second member 200 to connect the members together.

Preferably, the wedge element 1002 is inserted between the extrusion fins 101, 102 of the first extruded member 100 before driving the one or more fasteners 300.

Preferably, an extending portion 1012 of the bracket 1000 is inserted into a cavity 201 of the second member 200 before driving the one or more fasteners 300.

In some configurations, the extending portion 1012 is a second wedge element 3002' adapted for the second member 200 (FIG. 9).

Preferably, the bracket 1000 is inserted onto an outward facing side 3 of the extruded members 100, 200. Having a bracket 1000 adapted to be inserted onto the outward facing side of the extruded members may be beneficial as this location improves the ease of access of the bracket. Inserting the bracket 1000 at this location is beneficial, to improve ease of inserting fasteners 300 through the bracket, and/or operating a tool (e.g. driver) to drive the fasteners and form a rigid connection.

A bracket 1000 adapted to be located on the outward facing side 3 is also beneficial as it provides easy visualisation of the brackets on a structure so that any issues with the connections may be easily identified.

After the bracket is inserted onto the members, one or more fasteners 300 are driven into the fastener receiving apertures 1008 of the bracket 1000 causing localised deformation of a portion 104 of the first extrusion fin 101 to form a rigid connection.

As described above, preferably, the deformed portion 104 of the first extruded member 100 is deformed around the fastener 300 as the fastener is driven through the fastener receiving aperture 1008.

Preferably, in some configurations the one or more fasteners 300 form an interference fit as the fastener is driven through the fastener receiving aperture 1008.

Preferably, the connections are provided by the brackets such that the tools needed for installation of the building structure is minimised. For example, the pocket door 1 illustrated in FIG. 13, only requires a screwdriver or electric driver to connect the members 100, 200 and install the frame. This is beneficial as it simplifies the installation process for the structure.

The components described above may be provided as individual components to form part of a kitset. The kitset can be used to construct a desired building structure. One particular use of the bracket assembly described above is for a modular pocket-door 1, as shown in FIG. 13.

The bracket 1000, 2000, 3000 of the present invention helps provide a simple, easy to install solution for constructing building structures either by manufacturers, professional installers, or people without specialised installation experience.

The bracket assembly in the preferred configurations is not only easy to install, but can also provide a rigid and robust connection for extruded members.

Features of the bracket 1000 such as the specific size, profile and/or location of the wedge element 1002, constraining bracket flange 1010, and fastener receiving aperture 1008 work together in synergy to provide a unique connection. The rigid connection can be accomplished by simply driving a fastener 300 through the bracket 1000.

Preferably, the bracket 1000 of the present invention is adapted to connect extruded members without specialised features like slots. The bracket 1000 can be tailored to work with standard extruded members with extruded cavities to receive the bracket. Extruded cavities are a typical feature of extruded members.

Installation of building structures using the bracket 1000 is also simple because specialised tools are not necessary. In the described and illustrated configurations, only a screwdriver is necessary to install the bracket and connect the components together.

In the preferred configurations, the brackets 1000 are adapted to be located on the outward facing side 3 of the extruded members which also improve ease of access as described above.

The improved solution for connecting extruded members can reduce time and specialised skills required and therefore cost of installation.

Preferably the kitset comprises first and second extruded members 100, 200, brackets 1000, 3000 and fasteners 300 as described above. Preferably the first and second extruded members 100, 200 form part of a frame for the pocket-door 1.

In the preferred configurations, the kitset also includes a door panel 2.

FIG. 13 provides an illustration of what the pocket-door may look like after installing the components.

In the preferred configurations, the kitset for a modular pocket-door comprises a jamb connector 4 to join the door panel 2 to the frame. FIGS. 13 and 14 show possible locations of the jamb connector 4.

Note the door panel 2 in FIG. 13 has been shifted from its usual operating position to show the jamb connector 4 (and adjustable guide 5, described later.)

Figure 15A:
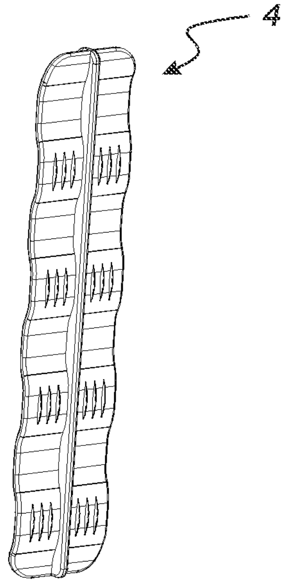
FIG. 15A shows a perspective view of a jamb connector.

Optionally, the jamb connector 4 has a wave profile as best shown in FIG. 15A. The wave profile of the jamb connector 4 provides improved engagement between the connector and the frame and/or door panel 2.

Figure 15B:
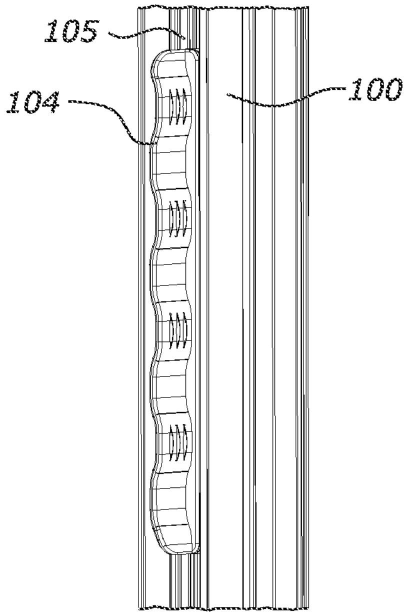
FIG. 15B shows a perspective view of the jamb connector in an extruded member.
Figure 16:
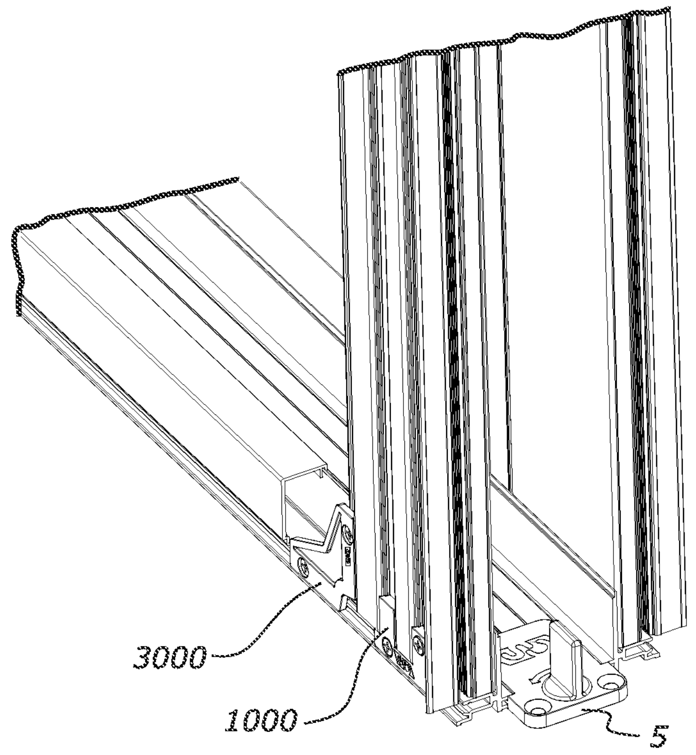
FIG. 16 shows a close-up view of an adjustable door guide in a pocket door.

Preferably, one side of the jamb connector 4 is configured to press-fit into a cavity 105 of an extruded member 100, as shown in FIG. 15B. The other side of the jamb connector 4 is configured to fit into a cavity in the door panel 2.

It can be appreciated that the described jamb connector 4 can provide advantages such as providing a reversible fixing of jamb, and/or providing an aesthetically pleasing connection, as the connector is hidden when installed.

Optionally, the kitset for a modular pocket-door also comprises an adjustable door guide 5, shown in FIGS. 13, 16 to 18. The adjustable door guide 5 is adapted to accommodate different door groove 6 widths with a standard guide member 7.

Figure 17:
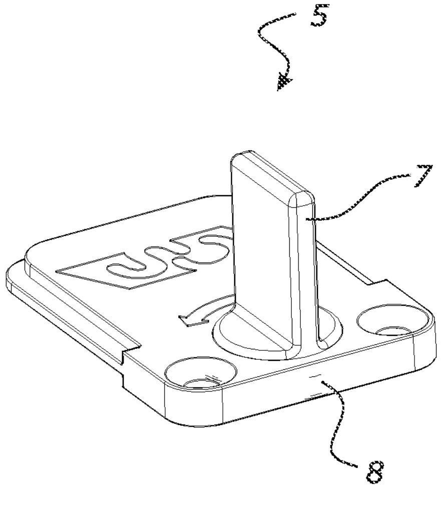
FIG. 17 shows a perspective view of the adjustable door guide.
Figure 18:
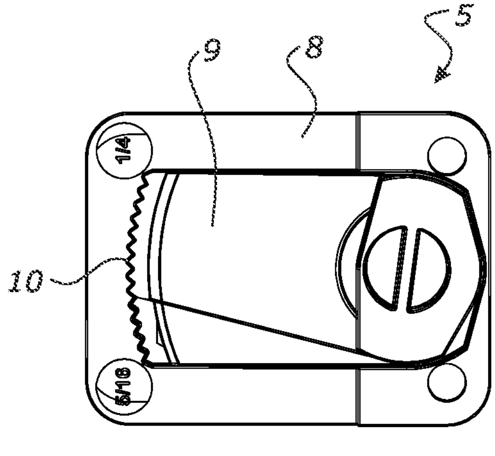
FIG. 18 shows a bottom view of the adjustable door guide.

In one configuration, as shown in FIG. 17, the adjustable door guide 5 has a vertical guide member 7 which rotates relative to a base support 8 to accommodate different groove 6 widths in the door panel.

Preferably, the adjustable door guide 5 comprises a rotating lever 9 engaging an underside of the base support 8.

In some configurations, the rotating lever 9 comprises teeth 10 which engages corresponding teeth on the base support 8 to control the rotation of the vertical guide member 7.

To those skilled in the art to which the invention relates, many changes in construction and widely differing embodiments and applications of the invention will suggest themselves without departing from the scope of the invention as defined in the appended claims.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention claimed is:

1. A bracket for connecting a first extruded member having spaced and generally parallel extrusion fins to a second member, the bracket comprising:

a base plate, a longitudinal wedge element extending from the base plate in an extending direction configured to be inserted in between the extrusion fins, the longitudinal wedge element having a wedge length and wedge width, an extrusion fin receiving channel adjacent the wedge element to receive a first extrusion fin of the first extruded member, one or more fastener receiving apertures through the base plate to receive a fastener to rigidly couple the bracket to the first extruded member, and a deformation cavity adjacent the fastener receiving aperture configured to receive a deformed extrusion portion of the first extrusion fin, and wherein the fastener receiving aperture comprises a diameter greater than the wedge width configured to receive a fastener with the greater diameter wherein the fastener receiving aperture is located on the base plate such that the deformed extrusion portion is forced into the deformation cavity and at least partially out of the extrusion fin receiving channel to form a rigid connection in a deformed condition when a fastener is located in the fastener receiving aperture.

2. The bracket as claimed in claim 1 further comprising a constraining bracket flange extending from the base plate in the extending direction, the constraining bracket flange spaced from the wedge element.

3. The bracket as claimed in claim 2 wherein the extrusion fin receiving channel is located between the wedge element and the constraining bracket flange.

4. The bracket as claimed in claim 2 wherein the constraining bracket flange comprises a recess to form a portion of the deformation cavity to receive the deformed extrusion portion of the first extrusion fin.

5. The bracket as claimed in claim 2 further comprising a second constraining element extending from the base plate, the second constraining element is spaced from the wedge element on a side opposite the constraining bracket flange to constrain a second extrusion fin of the first extruded member.

6. The bracket as claimed in claim 5 wherein the second constraining element is a second constraining bracket flange.

7. The bracket as claimed in claim 2 wherein the constraining bracket flange is substantially parallel to the longitudinal wedge element.

8. The bracket as claimed in claim 7 wherein the wedge length is 40% to 85% the length of the constraining bracket flange.

9. The bracket as claimed in claim 2 wherein the wedge length is 25% to 95% the length of the constraining bracket flange.

10. The bracket as claimed in claim 1 wherein at least a portion of the fastener receiving aperture intersects the extrusion fin receiving channel.

11. The bracket as claimed in claim 1 wherein the fastener receiving aperture is located off-centred with respect to said wedge element.

12. The bracket as claimed in claim 1 wherein the wedge width tapers from a proximal end to a distal end of the wedge element for insertion of the bracket.

13. The bracket as claimed in claim 1 further comprising a second longitudinal wedge element in a different orientation to the first longitudinal wedge element, the second longitudinal wedge element configured to be inserted into the second member.

14. A bracket assembly for connecting a first extruded member to a second member together, the assembly comprising:

a first extruded member having first and second extrusion fins, the first and second extrusion fins spaced and generally parallel each other, a second member connected to the first extruded member, a bracket as claimed in claim 1 connecting the second member to the first extruded member, and one or more fasteners inserted through the fastener receiving apertures, and wherein the fastener abuts the first extrusion fin such that the deformed extrusion portion is locally deformed at least partially out of the extrusion fin receiving channel and into the deformation cavity to form a rigid connection.

15. The bracket assembly as claimed in claim 14 wherein the first extrusion fin is constrained between the constraining bracket flange and the longitudinal wedge element in the extrusion fin receiving channel.

16. The bracket assembly as claimed in claim 15 wherein one or both of the first and second extrusion fins elastically deform in a tight-fit between the bracket and the first extruded member, when the wedge element is inserted.

17. The bracket assembly as claimed in claim 14 wherein the second member is a second extruded member comprising generally parallel extrusion fins.

18. The bracket assembly as claimed in claim 14 wherein the bracket assembly forms part of a pocket-door assembly.

19. A method for connecting an extruded member comprising:

providing a first extruded member having first and second extrusion fins, the first and second extrusion fins spaced and generally parallel each other, providing a second member, inserting the bracket as claimed in claim 1 into the first extruded member and the second member to connect the members together, driving one or more fasteners into the one or more fastener receiving apertures of the bracket causing localised deformation of a portion of the first extrusion fin to form a rigid connection.

20. The method for connecting an extruded member as claimed in claim 19 wherein the deformed portion of the first extruded member is deformed around the fastener as the fastener is driven through the fastener receiving aperture.

21. The method for connecting an extruded member as claimed in claim 19 further comprising inserting the wedge element between the extrusion fins of the first extruded member before driving the one or more fasteners.

22. The method for connecting an extruded member as claimed in claim 19 further comprising inserting an extending portion of the bracket into a cavity of the second member before driving the one or more fasteners.

* * * * *